Oct. 25, 1932.  E L. A MORROW  1,884,116
ASPARAGUS KNIFE
Filed April 24, 1931
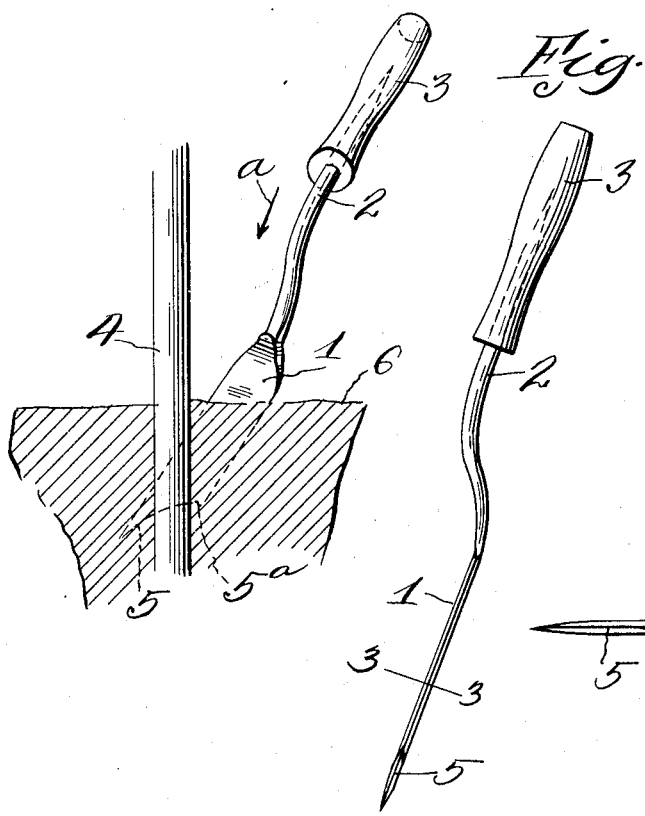
INVENTOR.
E. L. A. Morrow
BY Philip A. H. Jerrell
ATTORNEY.

Patented Oct. 25, 1932

1,884,116

UNITED STATES PATENT OFFICE

E LUSTER A MORROW, OF SUNNYSIDE, WASHINGTON

ASPARAGUS KNIFE

Application filed April 24, 1931. Serial No. 532,608.

The invention relates to asparagus knives, and has for its object to provide a device of this character comprising an elongated blade terminating at its upper end in an offset handle member adapted to be grasped by the operator for forcing the sharpened end of the blade into the ground and into engagement with a stalk for severing the stalk.

A further object is to provide the end of the blade with an arcuate cutting edge whereby there is a shearing action during the cutting operation.

A further object is to extend the shearing edge transversely of the blade at an angle other than a right angle so as to insure a cutting operation and to provide one end of the edge with a sharpened hooked portion or point for insuring a clean final cut of the stalk.

A further object is to offset the handle in relation to the blade whereby the operator may easily observe the position of the blade while using the tool without the hand obscuring the view of the blade.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a perspective view of the tool, showing the same in position for use.

Figure 2 is a side elevation of the tool.

Figure 3 is a detail perspective view of a portion of the blade showing a section on line 3—3 of Figure 2.

Figure 4 is a plan view of the cutting end of the blade.

Figure 5 is a vertical longitudinal sectional view taken on line 5—5 of Figure 4.

Referring to the drawing, the numeral 1 designates the elongated blade of the asparagus cutting tool, the upper end of which terminates in an offset member 2, on which is disposed the handle 3 adapted to be grasped by the operator while using the tool. The blade 1 is relatively thin whereby when the same is forced into the ground repeatedly, it will not tire the arm of the operator as is now the difficulty with cutting implements for cutting asparagus stalks 4, therefore it will be seen by having a relatively thin blade, the resistance incident to forcing the same into the ground is reduced to a minimum.

The forward end of the blade 1 is provided with an arcuate cutting edge 5, which will be noted, by referring to Figure 4, extends across the blade at an angle other than a right angle, therefore it will be seen that there will be a shear action when said cutting edge is forced into engagement with the stalk 4 beneath the ground for the cutting operation. To insure a clean final cut at the end of the shearing action, the cutting edge 5 is provided with a sharpened point 5a, which hooks and cuts the final portion of the stalk as the tool is forced downwardly against the stalk in the direction of the arrow a.

It has been found where straight tools are used having a handle member in the plane of the blade, the hand of the operator obscures the blade from view during the cutting operation, thereby preventing the operator from properly judging the relation of the blade to the stalk for severing the stalk several inches beneath the surface 6 of the ground.

It has also been found that where the cutting edge 5 is a straight one extending across the blade at a right angle, there is not a cutting or shearing action, consequently the stalk 4 is not cleanly severed, and more power is necessary for the cutting operation, which is a material factor where a device of this character is used for long periods.

The invention having been set forth what is claimed as new and useful is:—

1. An asparagus knife comprising an elongated blade, a handle carried by said blade, a cutting edge extending across one end of said blade at an angle other than a right angle to the longitudinal axis of the blade, the rear end of said edge terminating in a hooked cutting edge.

2. An asparagus knife comprising an elongated blade, an offset handle member carried by one end of said blade, an arcuate cutting edge carried by the other end of said blade at an angle other than a right angle and a hooked cutting edge at the rear end of the arcuate cutting edge.

In testimony whereof he hereunto affixes his signature.

E LUSTER A MORROW.